United States Patent
Coszach et al.

(10) Patent No.: US 8,431,677 B2
(45) Date of Patent: Apr. 30, 2013

(54) PURIFICATION OF A CONVENTIONAL POLYMER FLOW CONTAMINATED WITH PLA

(75) Inventors: Philippe Coszach, Courcelles (BE); Jonathan Willocq, Saint-Sauveur (BE)

(73) Assignee: Galactic S. A., Escanaffles (BE)

( * ) Notice: Subject to any disclaimer, the term of this patent is extended or adjusted under 35 U.S.C. 154(b) by 0 days.

(21) Appl. No.: 13/383,575

(22) PCT Filed: Jul. 14, 2010

(86) PCT No.: PCT/EP2010/060142
§ 371 (c)(1), (2), (4) Date: Jan. 11, 2012

(87) PCT Pub. No.: WO2011/015433
PCT Pub. Date: Feb. 10, 2011

(65) Prior Publication Data
US 2012/0116049 A1    May 10, 2012

(30) Foreign Application Priority Data
Aug. 6, 2009   (BE) .................................. 2009/0475

(51) Int. Cl.
*C08F 6/00*    (2006.01)
*C08G 69/10*   (2006.01)

(52) U.S. Cl.
USPC ........ 528/308.1; 528/345; 528/480; 528/500; 562/170; 562/179; 562/580; 562/589

(58) Field of Classification Search ............... 528/308.1, 528/345, 480, 500; 562/170, 179, 580, 589
See application file for complete search history.

(56) References Cited

U.S. PATENT DOCUMENTS

| 6,844,307 | B1 | 1/2005 | Sumner | |
| 7,507,561 | B2 * | 3/2009 | Ramakrishna et al. | 435/135 |
| 2003/0008927 | A1 | 1/2003 | Fuertes et al. | |
| 2012/0029228 | A1 * | 2/2012 | Coszach et al. | 560/179 |
| 2012/0142958 | A1 * | 6/2012 | Coszach et al. | 560/179 |

FOREIGN PATENT DOCUMENTS

| JP | 2007277389 A | 10/2007 |
| WO | 01/47860 A1 | 7/2001 |
| WO | 2005/013810 A2 | 2/2005 |

OTHER PUBLICATIONS

PCT International Search Report issued in connection with PCT/EP2010/060142 issued Oct. 8, 2010.

* cited by examiner

*Primary Examiner* — Terressa Boykin
(74) *Attorney, Agent, or Firm* — Reichel IP LLP; Kevin R. Erdman; Mark C. Reichel

(57) ABSTRACT

Method for purifying a conventional polymer stream (PE, PP, PET, PVC, etc.) contaminated with not more than 50% PLA, comprising steps for the suspension of the polymer with solubilisation of the PLA fraction and the recovery of the purified polymer after separation.

16 Claims, No Drawings

PURIFICATION OF A CONVENTIONAL POLYMER FLOW CONTAMINATED WITH PLA

CROSS-REFERENCE TO RELATED APPLICATIONS

This application is the U.S. national phase of PCT/EP2010/060142, filed Jul. 14, 2010. PCT/EP2010/060142 claims the benefit under the Paris Convention of Belgian Patent Application No. 2009/0475, filed on Aug. 6, 2009, the disclosures of which are explicitly incorporated by reference herein.

FIELD OF THE INVENTION

The present invention relates to a method for purifying a conventional polymer stream contaminated with PLA in order to enable the ready use thereof in conventional recycling processes.

PRIOR ART

The management of the end of life of plastics is a very important aspect in the viability of a plastic on the market (for example, PVC was withdrawn from the plastic bottle market failing an effective recycling system). As in the case of plastics from non-renewable sources (petrochemicals) and despite the more numerous end-of-life processes thereof, biopolymers are faced with technical challenges in respect of this end-of-life management. In particular, very large volumes, generated in the commodity markets, are involved. For this reason, it is important to deal with this problem.

Processes are already in place for recycling commodity polymers (PET, PP, etc.), such as the mechanical recycling of PET. PET bottles are converted by recyclers into chips, clean granules or immediately into semi-finished products. In 2007, all the PET marketed by Fost Plus (who promotes, coordinates and funds the selective collection, sorting and recycling of household packaging in Belgium) underwent full further processing. Also in Belgium, the residue rate following mechanical PET bottle recycling is relatively low, i.e. 15%. In some countries, this rate can approach 8%.

Moreover, biopolymers (obtained from renewable raw materials), and more specifically PLA, poly(lactic acid) or polylactide are being developed and extending the scope of the applications thereof. To date, PLA has demonstrated numerous advantages such as transparency or opacity, flexibility or rigidity (similar to that of polyesters), but also a gloss comparable to that of polystyrene. All these advantages inevitably lead to the success of this polymer in the field of packaging. Furthermore, PLA is particularly appreciated for food packaging due to the taste and smell barrier properties thereof and the increased resistance thereof to fat penetration. An increasing number of applications are flourishing on the market such as rigid fresh produce trays, lettuce packaging wrapping, disposable bottles and utensils (plates, cups, cutlery, etc.).

The increasing arrival of these new materials into everyday uses inevitably gives rise to some problems in terms of the end-of-life management of more "conventional" polymers. Indeed, it is possible to observe contamination of PET bottles streams with PLA bottles which are starting to appear on the market, since the sorting techniques generally implemented do not make an easy and absolute distinction between the petrochemical-based polymer and the biopolymer. Obviously, separation techniques exist based on optical properties (and not physical properties since the densities of both polymers are very similar), but they are not 100% effective and, at the present time, are only very rarely installed in recycling centres.

However, although the processes for recycling PET are very effective, they are relatively complex and sensitive. Indeed, it has been demonstrated that the presence of PLA, even at low levels in the region of one per cent, completely disrupts the process. Indeed, the residue rate is higher (and the yield is thus not as good) and the quality of the final PET obtained is impaired.

The aim of the present invention consists of offering a solution for this issue by pretreating the polymer stream with a view to removing the PLA content thereof to the minimal level.

BRIEF DESCRIPTION OF THE INVENTION

The present invention relates to a method for purifying a conventional polymer (PE, PP, PET, PVC, etc.) stream contaminated with not more than 50% by weight of PLA.

The method according to the present invention consists of suspending the contaminated mixture in a lactic ester, solubilising the PLA fraction in the lactic ester. The lactic ester, PLA and other dissolved impurities are then recovered for subsequent separate treatment. The non-dissolved polymer is recovered to be treated via conventional recycling processes.

DETAILED DESCRIPTION OF THE INVENTION

The method according to the invention successively comprises the following steps. Firstly, the routine polymer stream (PE, PP, PET, PVC, etc.) comprising not more than 50% by weight of PLA is shredded. A lactic ester is used to dissolve the PLA and other soluble contaminants and thus remove same, so as to obtain polymers meeting the requirements of conventional recyclers. Therefore, a distinction is made between a plurality of steps including suspension simultaneously with solubilisation, on one hand, and separation, on the other, which are the essential steps of the method.

1. Shredding of Waste Containing PLA

Within the scope of the present invention, the conventional polymer stream (PE, PP, PET, PVC, etc.) contaminated with PLA is shredded using various techniques, such as shearing, impact, dry or underwater shredding. Within the scope of the invention, one or a plurality of shredding steps may be envisaged, the number thereof being dependent on the initial product, and also on the cost of these operations and the desired final granulation.

It is also possible to pre- or post-treat this mixture of polymers containing PLA particularly by washing with water or other solutions.

If the material of the stream to be treated has a suitable specific area to start the dissolution/suspension, this shredding step may be left out without leaving the scope of the method according to the present invention, according to a further embodiment.

Following this shredding step, once completed, and to favour automation and processability, a densification step may be envisaged to compact the material, but this may slow down the subsequent step. This is a further embodiment of the invention.

2. Dissolution of PLA and Other Solubles in a Lactic Ester

The optionally shredded and optionally compacted polymer stream contaminated with PLA is then placed in contact with lactic ester. This lactic ester may be an alkyl lactate wherein the alkyl radical contains 1 to 12 carbon atoms. The alkyl lactate is preferentially selected from methyl, ethyl, propyl, butyl or hexyl lactate.

This step is preferentially performed with stirring.

The ratio of the polymer stream over alkyl lactate by weight is preferentially between 0.1 and 1, depending on the density and contamination level of the treated stream. This ratio should preferably be between 0.5 and 1.

The temperature conditions are situated between 50° C. and the melting point of the polymer to be purified.

The pressure is closely dependent on the operating temperature and may be situated between 0.05 and 20 bar, preferably between 1 and 10 bar, and more preferably between 1 and 5 bar.

The pressure and temperature conditions and the ratio of the polymer stream over lactic ester by weight are selected such that the method is economically viable and not denaturing for the polymer to be recovered.

Treatment at atmospheric pressure will thus be preferred, said pressure being reached at a temperature less than or slightly less than the boiling point of the lactic ester used: for example, between 50° C. and the boiling point of the alkyl lactate used.

Since the dissolution of PLA under these conditions is dependent on the temperature, the contact time will range from a few minutes to a few hours. When working at high temperatures, a short contact time will be preferred to prevent any degradation of the treated polymer.

3. Recovery of Purified Polymer by Means of Separation

The treated polymer stream is now in the form of a suspension. The lactic acid, PLA and any dissolved impurities have been removed by means of separation. This separation is obtained by filtration or any other means enabling solid/liquid separation.

In the conventional recycling steps, the recovered polymer can either be used as is, or be washed with water or another substance to remove the residual lactic acid or be dried after washing with water or another substance, according to further embodiments.

4. Subsequent Treatment of Ester Containing PLA

The filtrate from step 3 may for example be treated according to the alcoholytic PLA chemical recycling method, so as to produce a lactic ester from PLA. The alcohol used for this transesterification depolymerisation method will preferentially be that corresponding to the lactic ester used for purifying the polymer stream.

Further details and specificities of the invention, given as non-limitative examples hereinafter, emerge from the description as some possible embodiments thereof.

EXAMPLE 1

Solubilisation Test in a Lactic Ester

Within the scope of this example, shredded PLA cups were dissolved in various lactic acid esters, methyl lactate, ethyl lactate and n-butyl lactate, in an oven at 130° C., at atmospheric pressure and without stirring. The results of these dissolutions are contained in table 1.

TABLE 1

Dissolution of PLA in various lactic acid esters

| Test | Lactic ester | PLA:lactic ester ratio by weight | Time (hrs) | Complete dissolution |
|---|---|---|---|---|
| 1 | methyl | 1 | 1.5 | yes |
| 2 | ethyl | 1 | 2 | yes |
| 3 | n-butyl | 1 | 3 | yes |

An attempt was also made to dissolve various conventional polymers in ethyl lactate at 130° C., at atmospheric pressure, for 4 hours, without stirring. The results are contained in table 2.

TABLE 2

Dissolution in ethyl lactate of various shredded polymers

| Polymer | Polymer:EtL ratio by weight | Dissolution | Appearance of mixture |
|---|---|---|---|
| HDPE | 1 | no | suspension |
| PP | 0.14 | no | suspension |
| PET | 0.37 | no | suspension |
| PLA* | 1 | yes | solution |

*given as a comparative example

This example tends to prove the possibility of solubilising only PLA without altering the polymer to be recovered. The HDPE, PP and PET suspensions were then filtered, dried and weighed. No loss of mass was observed.

EXAMPLE 2

Treatment of a PET (90%)+PLA (10%) Mixture

Within the scope of this example, shredded PET bottles were voluntarily contaminated with shredded PLA bottles at a rate of 10%. This mixture imitates high contamination liable to be observed in a PET bottle stream from a conventional sorting process.

500 g of this polymer mixture was placed in a 2 liter flask to be treated with 1 kg of ethyl lactate, at atmospheric pressure, at a temperature of 130° C., with stirring, for 1 hour.

Once this treatment had been carried out, the suspension was filtered to recover the PET. The retentate was washed with water to remove the residual lactic ester and was then dried. The residual polymer had a mass after treatment of 450 g, corresponding to the quantity of PET in the initial mixture.

The filtrate was subjected to evaporation at 95° C. and 100 mbar to remove the ethyl lactate. At the end of evaporation, a polymer was recovered, which was washed with plenty of water and subsequently dried. The mass recovered was 52.5 g. This polymer was then placed in a beaker and immersed in an oil bath at 185° C. After 15 min, all of the polymer was in the molten state. This proves that the some fifty grams recovered consist of the PLA contaminating the initial mixture. Indeed, PET has a melting point of 260° C., which is markedly above the 185° C. applied during treatment.

This final example tends to prove the possibility of removing the contaminating PLA completely from the mixture to be treated. The PET can then be reused without problems in mechanical recycling processes.

The invention claimed is:

1. Method for purifying a polymer stream comprising PE, PP, PET and/or PVC and a fraction by weight of not more than 50% poly(lactic acid) (PLA), characterised in that it comprises the steps of:

a) suspending the polymer stream in a lactic ester suitable for dissolving the PLA fraction at a temperature comprised between 50° C. and the melting point of the polymer stream and a pressure comprised between 0.05 and 20 bar; and b) separating the suspension into a filtrate comprising lactic ester, PLA and other dissolved impurities and a solid fraction comprising recovered polymer.

2. Method according to claim 1, characterised in that the method further comprises shredding the polymer mixture prior to suspending the polymer mixture.

3. Method according to claim 1, characterised in that the polymer mixture is suspended in the lactic ester at a ratio of polymer mixture:lactic ester between about 0.1 and about 1 (weight:weight).

4. Method according to claim 3, characterised in that the ratio is between about 0.5 and about 1.

5. Method according to claim 1, characterised in that the polymer mixture is suspended in the lactic ester at a temperature between about 50° C. and the boiling point of the lactic ester.

6. Method according to claim 1, characterised in that the working pressure is between about 1 and about 10 bar.

7. Method according to claim 1, characterised in that the working pressure is between about 1 and about 5 bar.

8. Method according to claim 1, characterised in that the lactic ester is an alkyl lactate wherein the alkyl radical contains between 1 to 12 carbon atoms.

9. Method according to claim 6, characterised in that the alkyl lactate is selected from the group consisting of methyl, ethyl, propyl, butyl and hexyl lactate.

10. Method according to claim 1, characterised in that the purified polymer mixture is washed subsequent to the separating step.

11. Method according to claim 1, characterised in that the purified polymer mixture is dried subsequent to the separating step.

12. Method according to claim 1, characterised in that the polymer mixture is of petrochemical origin.

13. Method according to claim 2, characterised in that the polymer mixture is suspended in the lactic ester at a ratio of polymer mixture:lactic ester between about 0.1 and about 1 (weight:weight).

14. Method according to claim 11, characterised in that the ratio is between about 0.5 and about 1.

15. Method according to claim 2, characterised in that the polymer mixture is suspended in the lactic ester at a temperature between about 50° C. and the boiling point of the lactic ester.

16. Method according to claim 2, characterised in that the lactic ester is an alkyl lactate wherein the alkyl radical contains between 1 to 12 carbon atoms.

* * * * *